Oct. 14, 1969  R. E. RIEKE  3,472,030
ANTI-CLOGGING ENTRANCE GUARD FOR CULVERTS
Filed Feb. 16, 1968

Ray E. Rieke
INVENTOR.

BY Clarence A. O'Brien
and Harvey B. Jacobson
Attorneys

United States Patent Office 3,472,030
Patented Oct. 14, 1969

3,472,030
ANTI-CLOGGING ENTRANCE GUARD
FOR CULVERTS
Ray E. Rieke, Padroni, Colo. 80745
Filed Feb. 16, 1968, Ser. No. 705,956
Int. Cl. E02b *5/08, 8/02;* F16l *55/00*
U.S. Cl. 61—16                    2 Claims

ABSTRACT OF THE DISCLOSURE

An elongated openwork stout wire cage shown provides an anti-clogging guard for the entrance of a culvert, irrigation line, or an equivalent pipe. It functions to intercept, fend off and deflect twigs, small limbs and logs and debris and to angle and direct the same for lengthwise alignment with and passage into the entrance. It controls the flow of the water in that it minimizes the likelihood of the entrance becoming obstructed by weeds, debris and refuse. It comprises a cage made up of U-shaped rod members whose limbs or legs are encircled by a limit stop ring and wherein at least one limb is provided with an anchoring clevis for a holddown stake.

---

This invention relates to certain new and useful improvements in an anti-clogging guard for installation in the intake entrance of a culvert, irrigation pipe or fluid line and has to do with a simple, practical and easy-to-use guard which is in the form of an elongated openwork stout wire cage, more particularly, a cage made up of two or more duplicate U-shaped frames whose bight portions are joined in cruciform relationship and whose straight legs or limbs are spaced apart circumferentially.

Briefly, the cage has an inward or rearward half portion which constitutes and serves as adapter means, and an outward or forward half portion. The adapter means is expressly designed to be fitted telescopingly and is retained frictionally within the confines of the entrance end of the pipe or culvert as the case may be. The elongated outward half portion projects axially to and beyond and terminates at a point significantly away from the locale of the entrance. This elongated outward end portion is gradually reduced in cross-sectional dimension from the adapter means. Further, the leading end of the forward half portion is convexly rounded and is blunt. This blunt end functions to deflect and fend off twigs, small limbs, logs and miscellaneous weeds and debris and guidingly directs the same in a lengthwise direction into the entrance in a manner to prevent an accumulation of miscellaneous debris that would otherwise obstruct and perhaps even block the entrance and cause the water to back up objectionably and flood the adjacent area.

In carrying out a simplified form of the invention two elongated U-shaped frames or wickets are assembled in such a manner that the bight portions are welded or otherwise fixed together in cruciform relationship, This provides the openwork cage and also defines the reduced convex nose or deflector. The invention also features a ring-like collar which exteriorly embraces the median portions of the circumferentially spaced legs or limbs. This ring is positioned at the juncture of the forward and rearward half portions and constitutes a limit stop or shoulder. At least one limb is provided intermediate its ends and preferably outwardly of the ring with an outstanding relatively small U-shaped member here referred to as a clevis and which serves to accommodate, position and locate a holddown stake which is driven into the ground.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

It will simplify the description here to interpret the anti-clogging entrance guard for use in conjunction with the entrance end of a culvert or the like. The culvert is shown at 4 in FIG. 1 and the entrance, which may be lined or not, is denoted at 6. The ditch is denoted at 8 and certain miscellaneous sticks and twigs are denoted at 10.

Figure 1:
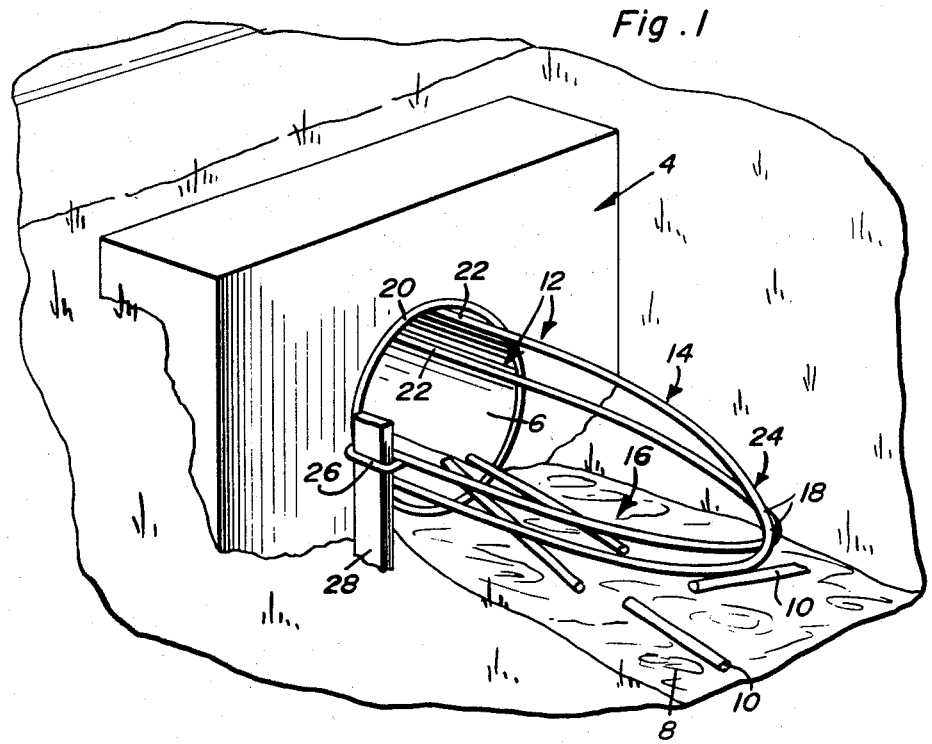
FIG. 1 is a view in perspective showing a ditch and culvert and showing, what is more important, the attachable and detachable anti-clogging entrance guard and how it is constructed, staked down and used for deflecting and flow-control purposes.
Figure 2:
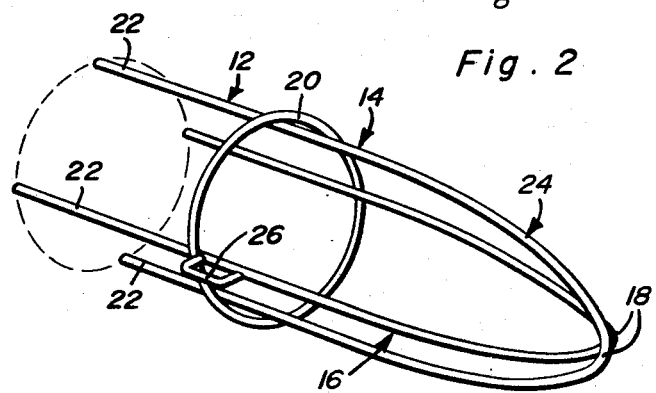
FIG. 2 is a view in perspective of the guard by itself.
Figure 3:
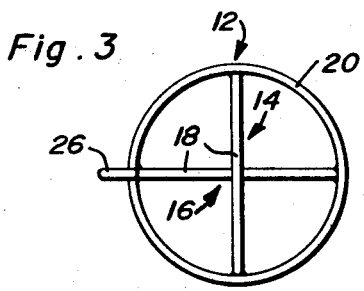
FIG. 3 is an end elevation of the guard looking at the same in a direction from right to left in FIG. 2.

The guard is designated as a structural entity by the numeral 12. It is of elongated openwork form and is conveniently referred to as an openwork cage. This cage is made up of a plurality of component parts. While more than two primary parts or units could be employed, only two such units are herein shown. Each unit comprises an elongated U-shaped frame or wicket which is formed from stout self-shape-retaining rod stock. This is to say, each U-shaped member is formed from a length of rod (of suitable gauge) bent upon itself intermediate its ends. One unit or frame is denoted by the numeral 14 and the other end by the numeral 16. It will be clear however that both units are identical in construction. The gradually diminished and rounded bight portions 18 are welded or otherwise joined together to provide a cruciform deflecting nose as is evident particularly in FIG. 3. A collar or ring 20 encircles and is welded to the intermediate portions of the legs or limbs of the two U-frames 14 and 16 and this designates a division point which transforms the interconnected frames into a rearward or inward half portion which constitutes adapter means. More specifically this adapter means comprises the straight free ends 22 which telescope into the entrance and retain the overall cage in operative position. The collar or ring 20 serves as a limit stop shoulder and abuts the surface of the culvert as shown in FIG. 1. The forward half portion 24 constitutes the axial extension and cage proper. This may be of any suitable length and is preferably proportional with the length suggested in FIG. 1. The intermediate portion of one leg of one U-frame is provided with an integral outstanding component here designated as an anchoring clevis 26. This clevis is close to but outwardly of the limit stop ring 20 and in practice serves to accommodate a wooden or an equivalent holddown stake 28 which is driven in place in the manner illustrated in FIG. 1.

It will be evident from the disclosure that the cage functions to prevent culverts, water mains and other pipes from becoming obstructed by debris, weeds, refuse and the like as suggested in FIG. 1. The adapter means 12 is inserted into the culvert and is readily applicable and removable. Experience has shown that any object (twig, limb, small log or the like) which is carried by the water stream through the cage will go through lengthwise and not remain in a crosswise clogging position. As experience has also shown, when a guard similar to that shown and described is not used the accumulating debris will sooner or later block and obstruct the pipe entrance. When it is used debris, especially weeds, will break up by the action of the water or current and will pass without clogging and blocking the entrance.

The legs or limbs are all of the same length. While it is within the purview of the concept to make the U-frames 14 and 16 from heavy-gauge wire, they are preferably made from noncorrodible rod members. More than two frames can be used and the frames need not, obviously, be at at right angles to each other.

It is believed that the guard shown and described well serves the purposes for which it is used. A more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a water flow pipe, a culvert for example, having an open entrance end, and an anticlogging entrance guard for said entrance end capable of intercepting, turning aside and fending off twigs, small limbs, logs and miscellaneous floating debris in a manner to minimize the likelihood of blockage of said entrance, said guard being bodily attachable and detachable and comprising an openwork elongated cage having an inward end portion fitting telescopingly and retentively in said entrance end and also having an elongated outward end portion projecting axially to and terminating at a point significantly beyond the locale of said entrance, said elongated outward end portion being gradually reduced in cross-sectional dimension from the point of entry into said entrance to said terminal end and the latter end being convexly rounded and blunt whereby to deflect twigs and limbs and guidingly direct some of the same lengthwise into said entrance in a manner to prevent the same from obstructing and perhaps blocking said entrance, said cage embodying two elongated duplicate U-shaped frames each embodying a pair of spaced parallel legs joined at their outer ends by an arcuate bight portion, the arcurately rounded bight portions of the respective U-frames crossing each other and being fixedly secured together in cruciform relation to define a bluntnosed debris turning deflector, the legs of said frames being circumferentially and amply spaced apart to provide relatively wide elongated spaces between said legs for passage of the aforementioned debris, and in combination, a rigid reinforcing ring exteriorly encircling and fixed to median portions of the legs of said U-shaped frames at the junctional point between the aforementioned inward and outward end portions of said cage and providing a rigidifying brace and limit stop, said limit stop abutting that portion of the pipe end marginally encompassing said entrance, at least one of said legs being provided intermediate its ends with an integral outstanding cage anchoring clevis being adapted to retentively encircle a holddown ground-penetrating stake.

2. The combination defined in and according to claim 1, and wherein said clevis is situated adjacent said ring and, specifically stated, just outwardly of the ring in a manner that the ring is capable of abutting said pipe end throughout the circumference of said ring.

References Cited

UNITED STATES PATENTS

| 624,339 | 5/1899 | Jones | 61—16 |
| 1,371,143 | 3/1921 | Bradburn | 210—460 |
| 1,555,841 | 10/1925 | Harris | 61—16 X |
| 2,640,593 | 6/1953 | Korb | 52—12 X |
| 2,962,866 | 12/1960 | Muehlfeld | 61—10 |

REUBEN FRIEDMAN, Primary Examiner

T. A. GRANGER, Assistant Examiner